Figure 1:
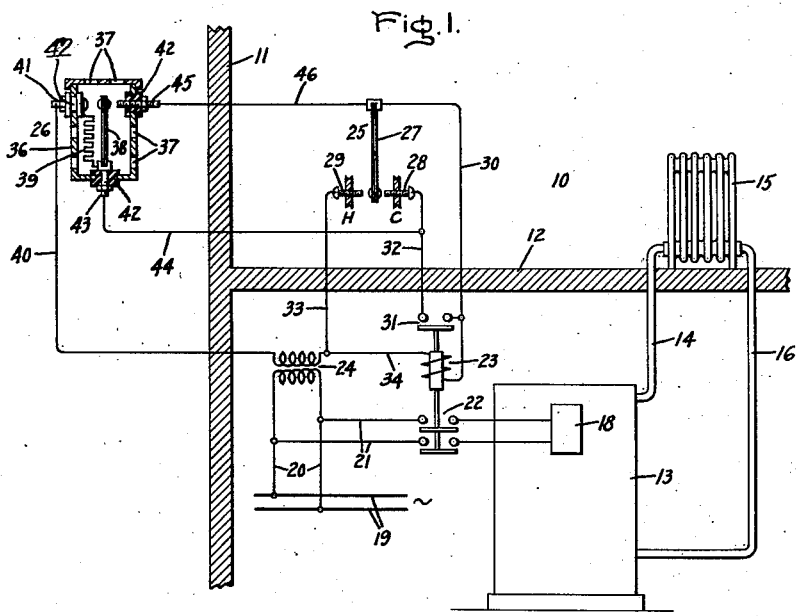

Aug. 1, 1939.          H. A. THOMPSON          2,168,178
                    TEMPERATURE CONTROL SYSTEM
                        Filed Oct. 22, 1936

Inventor:
Harris A. Thompson,
by Harry E. Dunham
His Attorney.

Patented Aug. 1, 1939

2,168,178

UNITED STATES PATENT OFFICE 2,168,178

TEMPERATURE CONTROL SYSTEM

Harris A. Thompson, Schenectady, N. Y., assignor to General Electric Company, a corporation of New York Application October 22, 1936, Serial No. 106,992

8 Claims. (Cl. 236—91)

This invention relates to temperature control systems and particularly to systems in which temperature changing means are controlled in response to variations in atmospheric conditions to maintain temperatures of enclosures within desirable limits.

Temperature changing systems, particularly those used for heating enclosures, operate with a time lag that varies somewhat with the type of heating means used and control thereof by thermal responsive means in the enclosure alone is not sufficient to prevent the temperature within the enclosure from alternately exceeding and falling below the limits at which the thermal responsive means is calibrated to operate. On rising temperatures, after initiation of operation of the heating means by the thermal responsive means and subsequent termination of operation, the enclosure temperature will exceed the upper limit of the temperature range at which the thermal responsive means is calibrated to operate. This excess in temperature, which is usually termed "overshooting", results from the fact that heat stored in the heating system is dissipated in the enclosure after termination of the operation of the heating means. Similarly, on falling temperatures and initiation of operation of the heating means, the enclosure temperature decreases below the lower limit of the range in which the thermal responsive means operates. This falling of the temperature below the lower limit, which is usually termed "undershooting", results from the fact that the heating system cannot supply a sufficient amount of heat immediately upon initiation of operation to prevent the temperature from decreasing below the aforementioned lower limit.

In order to compensate for varying rates of dissipation, or heat losses, as they may be termed, resulting from variations in atmospheric conditions, I propose to modify the customary control of the temperature changing means, which usually includes means responsive to conditions within the enclosure, by adding thereto thermal timing control means possessing characteristics, both as to the temperature changing means and heat losses, bearing a predetermined relationship to those of the enclosure and placed outside of the enclosure where it will be affected by variations in atmospheric conditions coresponding to those affecting the enclosure.

By suitably proportioning the heat losses of, the capacity of the temperature changing means associated with, and the temperature at which the outdoor timing control means operates, the time at which the operation of the main heating means is initiated and terminated, as compared to the time at which such control would be exerted by the indoor thermal responsive means alone, may be varied. If the outdoor control means is constructed with a shorter heating and cooling cycle, that is, it either initiates or terminates operation of the enclosure temperature changing means some time prior to the time that the indoor control means does, thereby "anticipating" the exertion of control function by the latter, then, with this time properly chosen, both undershooting and overshooting of temperatures within the enclosure will be greatly minimized.

However, under circumstances where outdoor conditions change rapidly over a considerable range, or where conditions within the enclosure change, as by opening doors or windows, thereby disturbing the normal heat balance between the enclosure and outdoors, the control should be such that the indoor control means exerts a dominant control both as to initiation and termination of operation of the main temperature changing means.

It is, therefore, a primary object of my invention to provide a new and improved temperature control system utilizing control means responsive to variations in conditions within and without the enclosure and in which the control means within the enclosure exerts a dominant control.

More specifically, it is an object of my invention to provide an improved control for temperature changing systems in which the temperature changing means is normally controlled by timing control means subject to outdoor atmospheric conditions possessing a shorter heating and cooling cycle than the structure being conditioned for the purpose of initiating and terminating operation of the temperature changing means and in which a dominant control is exerted by thermal responsive means within the enclosure whenever the enclosure temperature either rises or falls below predetermined maximum and minimum values.

Another object of my invention is to provide a new and improved anticipating temperature control system for heating means utilizing control means responsive to variations in the temperature conditions within and without an enclosure conditioned by said heating means in which the initiation of operation is normally controlled by the control means without the enclosure but in which a dominant control is exerted by the control means within the enclosure so that operation of the heating means may be initiated by the latter in spite of temperature conditions obtaining without the enclosure.

Still another object of my invention is to provide a new and improved anticipating temperature control system for heating means utilizing control means responsive to variations in temperature conditions within and without an enclosure conditioned by said heating means in which the termination of operation is normally controlled by the control means without the enclosure but in which a dominant control is exerted by the control means within the enclosure so that operation of the heating means may be terminated by the latter in spite of temperature conditions obtaining without the enclosure.

Further objects and advantages of my invention will become apparent as the following description proceeds, and the features of novelty which characterize my invention will be pointed out with particularity in the claims annexed to and forming part of this specification.

Figure 2:
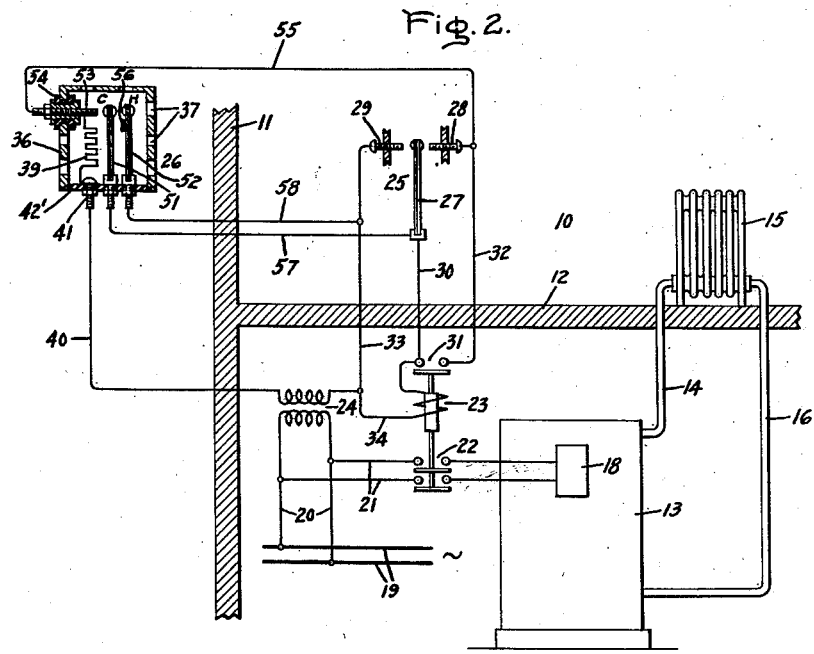

For a better understanding of my invention reference may be had to the accompanying drawing in which Fig. 1 illustrates diagrammatically a heating system for an enclosure and illustrates schematically a control system therefor embodying features of the present invention; and Fig. 2 illustrates similarly a modification of the control system.

Referring to Fig. 1, reference numeral 10 illustrates an enclosure which may be a building or simply a part thereof, as a room. Only a part of the enclosure is illustrated, the illustrated portion consisting of side walls 11 and flooring 12. Below the floor is placed a suitable temperature changing means such as a furnace 13 of any well-known type adapted to supply through a conduit 14 a heat exchange medium such as steam or hot water to a heat exchanger 15 positioned within the enclosure. The heat exchange medium is returned from the heat exchanger to the furnace through a return conduit 16.

The furnace 13 may be of any of the well-known type and is provided with a suitable control means 18 which, when supplied with electrical energy, will either initiate operation of the temperature changing means or otherwise increase the heat supplied to the heat exchange medium. Electrical energy is supplied to the control means from a suitable source of alternating current electricity 19 through the pairs of conductors 20 and 21. An automatically controlled normally open switch 22 is placed in the supply line 21 to control the supply of energy to the control means 18.

The switch controlling the energization of the furnace control means is operated by suitable relay means 23 selectively energized through a transformer 24 connected to the source of supply through conductors 20 and a pair of condition responsive means 25 and 26 positioned within and without the enclosure, respectively.

The thermal responsive control means 25, or indoor thermostat as it will be referred to hereinafter, may be of any well-known type having a neutral position between two control positions and is illustrated as a bimetallic thermal responsive element 27 having associated therewith a pair of adjustably mounted contacts 28 and 29. Element 27 is arranged so that it will move from its neutral position in which it is shown to the right to engage "cold" contact 28 on a decrease in temperature below a predetermined lower limit. Likewise, on an increase in temperature above a predetermined upper limit, element 27 will engage the left-hand contact 29, which may therefore be termed a "hot" contact. Bimetallic element 27 is connected by a conductor 30 to the winding of relay 23 and to one of a pair of contacts forming part of a switch 31 also operable by the relay 23 and forming part of a holding circuit for the relay that is closed whenever the relay is energized. The other contact of the switch 31 is connected by a conductor 32 to the cold contact 28. The hot contact 29 is connected by a conductor 33 to one side of the secondary winding of transformer 24 and through conductor 34 to the winding of relay 23.

In the modification illustrated in Fig. 1 the outdoor thermal responsive means 26 comprises a metallic casing 36 with a plurality of perforations 37. The control means 26, which may be conveniently referred to as the outdoor thermostat, is constructed preferably of metal so that it will have suitable mass and thermal characteristics and is provided with the perforations so that it will be affected by variations in wind velocity as well as solar radiation and temperature changes outdoors. Within the casing is positioned a bimetallic thermal responsive element 38 having associated therewith a suitable temperature changing means 39, illustrated as a resistor. The resistor is connected in series with conductor 40 leading to one terminal of the secondary winding of the transformer through a suitable terminal 41, mounted on an insulating bushing 42. The series connection of the resistor enables the latter to heat the thermostatic element and casing whenever the secondary circuit of the transformer is closed. Bimetallic element 38 and the resistor are connected through a suitable terminal 43, also mounted on an insulating bushing 42, and a conductor 44 to the conductor 32. Also associated with the outdoor thermostat is an adjustably mounted contact member 45 suitably insulated from the casing 36 by an insulating bushing 42 and connected by a conductor 46 to bimetallic element 27 of the indoor thermostat.

The casing 36 of the outdoor thermostat is constructed with a mass possessing thermal characteristics such that when associated with a heater of a predetermined capacity and a thermal responsive element operating at a predetermined temperature it will have somewhat shorter heating and cooling cycles than that of the enclosure. The resistor 39, being in series with the energizing circuit for relay 23, will heat the casing whenever the furnace supplies heat to the enclosure. Since the enclosure and the outdoor control means are both similarly affected by variations in outdoor atmospheric conditions and the outdoor control means has a somewhat shorter cooling cycle than the enclosure 10 then, upon termination of operation of the furnace and cessation of current flow through resistor 39, the outdoor control means will cool somewhat more rapidly than the enclosure 10. By arranging the control so that the outdoor control means may initiate operation of the furnace some time prior to the time at which the indoor thermostat would place it in operation I provide an anticipating control in which the outdoor thermostat anticipates a call for heat by the indoor thermostat and thus obviates undershooting. By thus supplying heat to the enclosure in smaller increments overshooting is likewise minimized. The arrangement, as will be described more fully in the succeeding paragraphs, is such that while the outdoor thermostat may initiate operation of the furnace under most conditions yet upon sudden variations in outdoor atmospheric conditions disturbing the rate of dissipation of heat from the enclosure the indoor thermostat will exert a dominant or master control.

When the system is initially placed in operation and with the temperature within enclosure 10 below a predetermined minimum value thermostatic element 27 will be in engagement with cold contact 28 thereby closing an energizing circuit for relay 23. This energizing circuit extends from the secondary winding of transformer 24 through conductor 40, terminal 41, resistor 39, terminal 43, conductor 44, conductor 32, cold contact 28 and thermal responsive element 27 in engagement therewith, and conductor 30 to the relay winding and thence through conductor 34 to the other side of the transformer secondary winding. The flow of current through this circuit causes the resistor 39 to heat casing 36 and bimetallic element 38 and energization of relay 23 effects closure of switches 22 and 31. Closure of switch 22 effects energization of the control means 18 to initiate operation of furnace 13 and closure of switch 31 results in the closure of a holding circuit for the relay winding 23. The holding circuit extends through switch 31, conductors 32 and 44 to terminal 43, thereby cutting out that portion of the initial energizing circuit including the indoor thermostat.

The furnace 13 will remain in operation until the enclosure temperature reaches a predetermined maximum value at which time element 27 will engage its hot contact 29 and thereby short circuit relay 23 through a circuit including conductor 33, contact 29, thermal responsive element 27 and conductor 30. The short circuiting of the relay effects its deenergization and the subsequent opening of switches 22 and 31. The opening of these switches effects termination of the operation of heater 39 and furnace 13.

Since the cooling cycles of the outdoor thermostat are somewhat shorter than that of the enclosure, then after a time determined by outdoor atmospheric conditions, the outdoor thermostat will energize relay 23. The energizing circuit for the relay extends from one side of the secondary winding of the transformer through conductor 40, heating element 39, thermal responsive element 38, in engagement with contact 45, conductor 46, and conductor 30 to the relay winding and thence through conductor 34 to the other side of the secondary winding. Energization of the relay again renders effective the heating means 39 and furnace 13.

The above described operation according to which the outdoor thermostat initiates operation of the furnace is the normal operation of the system and will obtain until the atmospheric conditions change suddenly and require an increased or decreased amount of heat prior to the time that the enclosure temperature has decreased. If an increased amount of heat is required the outdoor thermostat will call for initiation of operation of the furnace and the indoor thermostat may be either in a position where it calls for termination of operation or additional heat. Assuming the indoor thermostat is calling for termination of operation, then the outdoor thermostat will be in engagement with its associated contact 45 and the indoor thermostat is in a position to close the previously described short circuit for the relay winding 23. Under these conditions it will be obvious that the indoor thermostat will prevent energization of relay 23 and thereby prevent operation of furnace 13 until the temperature within the enclosure decreases to a value below the upper range of the calibration. At the same time the above described short circuit will decrease the resistance of the circuit including the secondary winding of the transformer and resistor 39 by cutting out the resistance of the relay winding, so that an increased amount of heat will be given off by the resistor. The last mentioned circuit wil include conductor 40, heating element 39, thermostatic member 38 in engagement with contact 45, conductor 46, bimetallic element 27 in engagement with its hot contact 29 and conductor 33. After a certain length of time the bimetallic element 38 will be actuated and move out of engagement with contact 45 and thus adjust itself to correspond to the irregular changes in heat losses from the building.

On a sudden decrease in outdoor temperatures and with the indoor thermostat calling for additional heat, it is obvious that both thermostats will be in a position to initiate operation of the furnace.

If suddenly a decreased amount of heat is required because of a rapid rise in outdoor temperatures, then the outdoor thermostat will be delayed somewhat in initiating operation of the furnace. If it should call for heat and the temperature within the enclosure were sufficiently high, then the indoor thermostat will exert a dominant control as explained above in connection with the case where similar conditions obtained.

The modification of Fig. 2 is in many respects similar to that of the modification illustrated in Fig. 1 but in addition it is more effective in preventing overshooting of the temperature within the enclosure as well as undershooting. It also furnishes a control in which the indoor thermostat acts as a master control to prevent the enclosure temperature from either rising above or falling below predetermined maximum and minimum temperature values.

In the modification of Fig. 2 parts similar to those in Fig. 1 have been given like reference numerals. The main distinction between the two control arrangements lies in the construction of the outdoor thermal responsive control means 26. In Fig. 2 it is provided with two thermal responsive elements 51 and 52 mounted on an insulating base 42', the former adapted to engage an adjustably mounted cold contact 53 and the contact carried by element 52, while the latter is adapted under certain conditions to move out of engagement with the contact carried by element 51. A stationary stop 56 made of insulating material is provided between the elements 51 and 52 to limit the movement of these elements under certain conditions. Element 51 is prevented from moving more than a predetermined distance toward element 52 and element 52 is likewise prevented from moving more than a predetermined distance toward element 51. The purpose of this arrangement will be explained hereinafter.

The circuit connections are for the most part as illustrated in Fig. 1 but for purpose of simplicity will be briefly described again. The indoor thermal responsive element 27 is connected by conductor 30 to one of the contacts associated with the holding circuit controlling switch 31. Cold contact 28 of the room thermostat is connected by conductor 32 to the other contact associated with the holding switch and hot contact 29 is connected by conductor 33 to one side of the secondary winding of the transformer 24, which is also connected by conductor 34 to the relay winding 23. Resistor 39, also mounted on insulating base 42', is connected through conductor 40 and a terminal 41 to the other side of the secondary winding of the transformer and is therefore in series therewith. The resistor is likewise connected to contact 53 which is in turn suitably insulated by a bushing 54 and connected by conductor 55 to conductor 32 and the cold contact 28 of the indoor thermostat. Element 51 is connected by a conductor 57 to the indoor thermostatic element 27 and thermostatic element 52 is similarly connected by conductor 58 to conductor 33.

In the modification of Fig. 2 the outdoor control means is arranged to have heating and cooling cycles that are shorter than that of the enclosure so that it normally controls the operation of the furnace under substantially constant atmospheric conditions to prevent under and over-shooting of the enclosure temperature and maintains the temperature thereof within desired limits.

When the system is first placed into operation the indoor thermostat will engage its cold contact and thereby close an energizing circuit for relay 23. The energizing circuit extends from one side of the secondary winding of the transformer through conductor 40, terminal 41, heating element 39, terminal 53, conductor 55, contact 28, bimetallic element 27 in engagement therewith, to the relay winding 23 and thence through conductor 34 back to the other side of the secondary winding. Closure of the circuit not only energizes relay 23 but also renders effective the heating element 39 and initiates operation of furnace 13, the latter being rendered operative by closure of switch 22 as previously described. Simultaneously with the closure of switch 22 the switch 31 is closed to close the holding circuit for the relay winding. The heating cycle of the outdoor control means being shorter than that of the enclosure, the outdoor control means will terminate operation of the furnace some time prior to the time that the indoor thermostat would do so. The termination of operation of the furnace is accomplished by the closure of a short circuit for the relay winding 23 by engagement of bimetallic element 51 with bimetallic element 52. The short circuit extends from the relay winding 23 through conductor 30, conductor 57, bimetallic element 51 which has been actuated into engagement with bimetallic element 52, conductor 58 and conductors 33 and 34. Short circuiting of the relay winding effects deenergization of the heater 39 simultaneously with the termination of operation of the furnace 13.

Because of the fact that the cooling cycle of the outdoor thermostat is shorter than that of the room the outdoor thermostat will initiate operation of the furnace by making engagement with contact 53. The energizing circuit extends from one side of the transformer winding 24 through conductor 40, terminal 41, heating element 39, contact 53, bimetallic element 51, conductors 57 and 30 to the relay winding and thence through conductor 34 back to the secondary winding of the transformer. Operation of the furnace is again initiated in a previously described fashion and heating element 39 is energized for the same length of time that the furnace is in operation.

The above described control of the furnace by the outdoor thermostat continues until such time that the heat losses between the enclosure and the atmosphere and the outdoor control means and the atmosphere are unbalanced as by a sudden variation in outdoor temperature or in the enclosure temperature as by opening doors or windows. If the outdoor control means has called for termination of operation and the enclosure temperature falls below a predetermined minimum value then the indoor thermostat will effect operation of the furnace. At this time the indoor thermostat will engage its cold contact to close a previously described energizing circuit for the relay, but it may be that at this time the outdoor thermostat is in its off position, short circuiting the relay winding. However, in this case the heating element 39 is possessed of a greater heating capacity due to the increased current flow therethrough resulting from the short circuit around the relay winding 23 and it heats element 52, causing it to move out of engagement with element 51, the movement of the latter being limited by stop 56. The short circuit across the relay is thus removed and it is energized by the indoor thermostat. The indoor thermostat thus acts as a master control to provide the enclosure with heat whenever the temperature of the enclosure is below a predetermined minimum value.

In case the outdoor temperature drops suddenly and the outdoor thermostat therefore calls for heat and the enclosure temperature is above a predetermined maximum value then the indoor thermostat will prevent operation of the furnace by placing a short circuit around the relay winding.

It will be obvious to those skilled in the art that the arrangement just described provides a control capable of preventing over and under-shooting of enclosure temperatures and at the same time provides a control system in which the indoor thermostat acts as a dominant or master control under all conditions.

What I claim as new and desire to secure by Letters Patent of the United States is:

1. In combination, temperature changing means for an enclosure, a relay adapted to be energized for initiating operation of said temperature changing means, a source of energy, a circuit including an outdoor thermostat and a resistor in series and in heat conducting relationship therewith for energizing said relay, a circuit including said resistor and an indoor thermostat for energizing said relay, and means including said indoor thermostat for deenergizing said relay.

2. In combination, temperature changing means for an enclosure, a relay adapted to be energized for initiating operation of said temperature changing means, a source of energy, a circuit including an outdoor thermostat and a resistor in series and in heat conducting relationship therewith for energizing said relay, a circuit including said resistor and an indoor thermostat for energizing said relay, a holding circuit for said relay adapted to be closed thereby, and means including said indoor thermostat for short circuiting said relay to deenergize it.

3. In combination, temperature changing means for an enclosure, a relay adapted to be energized for initiating operation of said temperature changing means and deenergized for terminating its operation, a source of energy, an energizing circuit for said relay including a resistor, temperature responsive means positioned outdoors and adapted to be heated by said resistor, a second energizing circuit for said relay including said resistor and thermal responsive means positioned within said enclosure, a circuit for deenergizing said relay including said first mentioned thermal responsive means and a third thermal responsive means also adapted to be heated by said resistor, and a second circuit for deenergizing said relay including said second mentioned thermal responsive means.

4. In combination, heating means for an enclosure, thermal timing control means therefor subject to outdoor atmospheric conditions and including a heater and a thermostatic control element heated thereby and operable upon cooling for energizing both said enclosure heating means and said heater, and thermostatic means responsive to temperature variations within said enclosure and operable at a selected maximum temperature for deenergizing both said heating means and said heater to start cooling of said thermostatic control element and operable at a selected minimum temperature for energizing both said heating means and said heater independently of the control of said thermostatic control element.

5. In combination, heating means for an enclosure, outdoor thermal timing control means therefor including a heater and a thermostatic control element heated thereby, energizing means controlled by said element upon cooling thereof for energizing both said enclosure heating means and said heater to effect simultaneous heating operation thereof, holding means for maintaining said energizing means effective to energize both said enclosing means and said heater during heating of said element, and thermostatic means responsive to temperature variations within said enclosure and operable at a predetermined maximum temperature for controlling said holding means to stop heating operation of said enclosure heating means and said heater and operable at a predetermined minimum temperature for controlling said energizing means to effect energization of both said heating means and said heater independently of the control of said thermostatic element.

6. In combination, heating means for an enclosure, an outdoor thermostatic timing control element movable upon cooling to a predetermined position, control means controlled by said element in said position for starting operation of said heating means, a heater for said element, said control means having means for energizing said heater during operation of said heating means, a thermostat responsive to the enclosure temperature for controlling said control means to stop operation of said heating means, and control means under the joint control of said element and said thermostat for maintaining said heater energized when operation of said heating means is stopped with said timing control element in said predetermined position.

7. In combination, heating means for an enclosure, a thermostat responsive to the enclosure temperature, control means controlled by said thermostat for starting and stopping operation of said heating means, an outdoor thermostatic timing control element movable upon cooling to a predetermined position, said control means having means under the control of said element in said position for starting operation of said heating means, a heater for said element, said control means having means for rendering said heater effective and ineffective upon starting and stopping operation of said heating means, and said control means having means under the joint control of said thermostat and said element for maintaining said heater effective when operation of said heating means is stopped with said control element in said predetermined position.

8. In combination, heating means for an enclosure, a thermostatic device responsive to variations in the enclosure temperature below and above a predetermined range, control means operable upon response of said device for starting and stopping operation of said heating means, a thermal timing control element having a cooling period dependent upon outdoor conditions, means rendered effective upon cooling of said thermostatic element when the enclosure temperature is within said range for controlling said control means to start operation of said heating means, a heater for said element, and control means for rendering said heater effective to heat said element during operation of said heating means.

HARRIS A. THOMPSON.